United States Patent
Chang (10) Patent No.: US 9,958,002 B2
(45) Date of Patent: May 1, 2018

(54) DUST-PROOF SAFETY HOOK

(71) Applicant: Win Chance Metal Co., Ltd., Changhua, Changhua County (TW)

(72) Inventor: Wen-Cheng Chang, Changhua (TW)

(73) Assignee: Win Chance Metal Co., Ltd., Changhua (TW)

( * ) Notice: Subject to any disclaimer, the term of this patent is extended or adjusted under 35 U.S.C. 154(b) by 15 days.

(21) Appl. No.: 15/212,544

(22) Filed: Jul. 18, 2016

(65) Prior Publication Data

US 2018/0017095 A1    Jan. 18, 2018

(51) Int. Cl.
*F16B 45/02* (2006.01)
*F16B 45/04* (2006.01)

(52) U.S. Cl.
CPC .............. *F16B 45/02* (2013.01); *F16B 45/04* (2013.01)

(58) Field of Classification Search
CPC .................................. F16B 45/02; F16B 45/04
See application file for complete search history.

(56) References Cited

U.S. PATENT DOCUMENTS

| | | | | |
|---|---|---|---|---|
| 5,505,013 A * | 4/1996 | Gois | ................. | A01K 75/00 24/598.3 |
| 5,608,953 A * | 3/1997 | Petzl | ................. | F16B 45/02 24/582.11 |
| 5,791,025 A * | 8/1998 | Maurice | ................. | F16B 45/02 24/582.11 |
| 6,588,076 B1 * | 7/2003 | Choate | ................. | F16B 45/02 24/599.1 |
| 7,320,159 B2 * | 1/2008 | Petzl | ................. | F16B 45/02 24/599.5 |
| 7,624,483 B1 * | 12/2009 | Jang | ................. | F16B 45/02 114/114 |
| 8,276,247 B2 * | 10/2012 | Yang | ................. | F16B 45/02 24/599.5 |
| 9,003,617 B2 * | 4/2015 | Walker | ................. | F16B 45/02 24/599.1 |
| 9,212,688 B2 * | 12/2015 | Jang | ................. | F16B 45/02 |
| 9,267,535 B2 * | 2/2016 | Jang | ................. | F16B 45/02 |
| 9,719,552 B2 * | 8/2017 | Moine | ................. | F16N 45/02 |
| 2003/0167608 A1 * | 9/2003 | Petzl | ................. | F16B 45/02 24/600.2 |
| 2005/0246874 A1 * | 11/2005 | Hsu | ................. | F16B 45/02 24/598.2 |

(Continued)

*Primary Examiner* — Robert Sandy
*Assistant Examiner* — Louis A Mercado
(74) *Attorney, Agent, or Firm* — Alan D. Kamrath; Kamrath IP Lawfirm, P.A.

(57) ABSTRACT

A dust-proof safety hook contains: a body, a connection shaft, a returning element, a housing sleeve, a resilient element, a rotary sheath, and a positioning bolt. The body includes an accommodation space, an opening, a first segment, and a second segment. The connection shaft includes a first part and a second part, and the returning element is mounted between the body and the connection shaft. The housing sleeve includes a slot which has a limiting portion and two notches. The resilient element is fitted with the connection shaft, and the rotary sheath includes a through orifice and a cut. The positioning bolt is inserted into the through orifice of the rotary sheath and the limiting portion of the slot of the housing sleeve, such that the rotary sheath moves along the slot of the housing sleeve by way of the positioning bolt.

7 Claims, 9 Drawing Sheets

(56) References Cited

U.S. PATENT DOCUMENTS

| | | | | |
|---|---|---|---|---|
| 2006/0130539 A1* | 6/2006 | Yu | ........................ | E05B 37/025 |
| | | | | 70/18 |
| 2006/0137151 A1* | 6/2006 | Thompson | .............. | F16B 45/02 |
| | | | | 24/598.2 |
| 2006/0219479 A1* | 10/2006 | Petzl | ....................... | F16B 45/02 |
| | | | | 182/3 |
| 2008/0022497 A1* | 1/2008 | Thompson | .............. | F16B 45/02 |
| | | | | 24/598.1 |
| 2008/0104810 A1* | 5/2008 | Liang | ..................... | F16B 45/02 |
| | | | | 24/600.2 |
| 2009/0056088 A1* | 3/2009 | Petzl | ....................... | F16B 45/02 |
| | | | | 24/599.9 |
| 2010/0180411 A1* | 7/2010 | Jang | ....................... | A01K 73/12 |
| | | | | 24/596.1 |
| 2010/0186202 A1* | 7/2010 | Schwappach | ........... | F16B 45/02 |
| | | | | 24/599.9 |
| 2010/0325848 A1* | 12/2010 | Liang | ..................... | F16B 45/02 |
| | | | | 24/598.3 |
| 2011/0023275 A1* | 2/2011 | Thompson | .............. | F16B 45/02 |
| | | | | 24/594.1 |
| 2014/0082901 A1* | 3/2014 | Yeh | ........................ | F16B 45/02 |
| | | | | 24/599.1 |
| 2014/0245576 A1* | 9/2014 | Perner | .................... | F16B 45/02 |
| | | | | 24/600.1 |
| 2014/0361564 A1* | 12/2014 | Huang | ................... | F16B 45/02 |
| | | | | 294/82.11 |
| 2016/0061251 A1* | 3/2016 | Rogelja | .................. | F16B 45/02 |
| | | | | 24/598.3 |
| 2016/0363159 A1* | 12/2016 | Yeh | ........................ | F16B 45/02 |

* cited by examiner

DUST-PROOF SAFETY HOOK

BACKGROUND OF THE INVENTION

Field of the Invention

The present invention relates to a safety hook configured to hang a rope and, more particularly, to a dust-proof safety hook.

Description of the Prior Art

Figure 11:
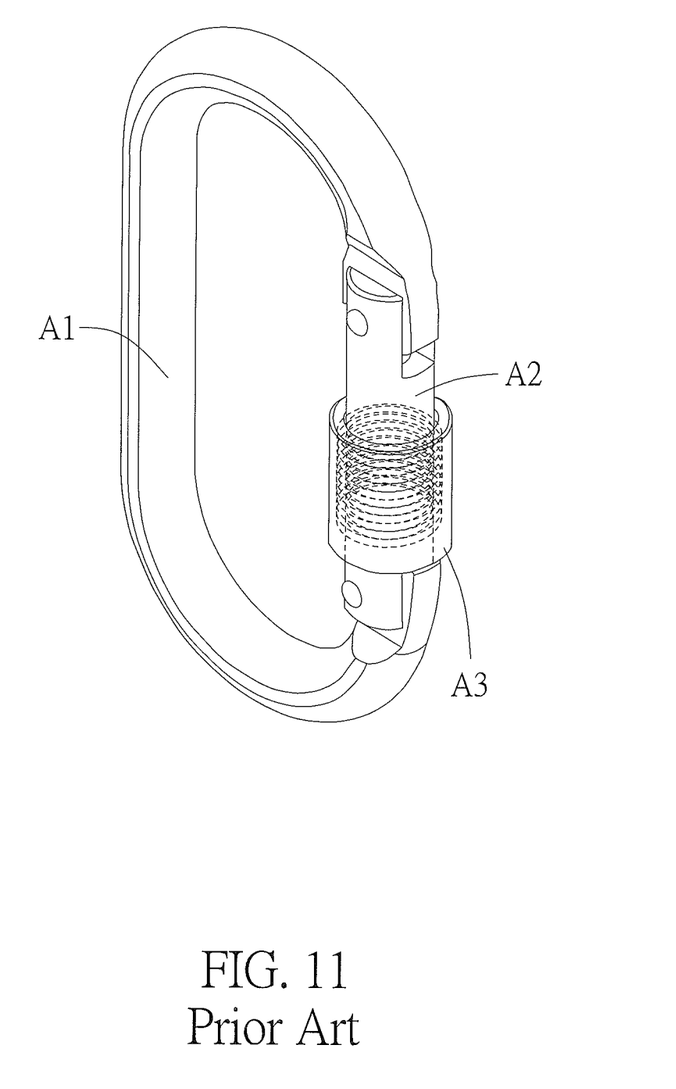
FIG. 11 is a perspective view of a conventional safety hook.

Referring to FIG. 11, a conventional safety hook contains a body A1 and a connection shaft A2 fixed on one end of an opening of the body A1. The connection shaft A2 moves to close the opening, and the connection shaft A2 has outer threads screwing with inner threads of a nut A3. Hence, the nut A3 is screwed tightly or unscrewed loosely to close or to open an aperture between the connection shaft A2 and the body A1. However, such a conventional safety hook is operated troublesomely and slowly.

Figure 12:
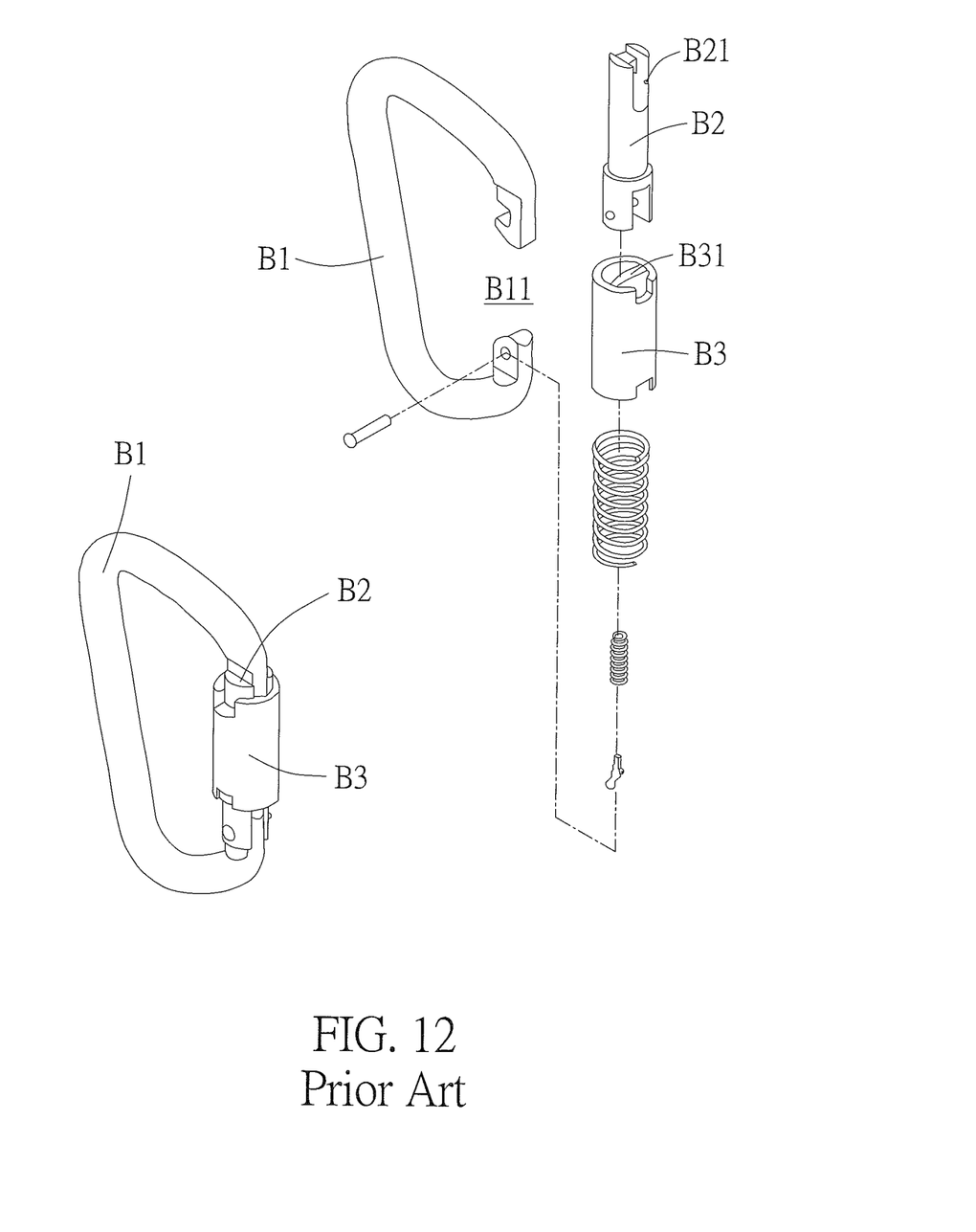
FIG. 12 is a perspective view of another conventional safety hook.

With reference to FIG. 12, another conventional safety hook contains a body B1 and a connection shaft B2 mounted on one end of an opening B11 of the body B1. The connection shaft B1 moves to close the opening B11 and has a tab B21 fitting with a rotary sheath B3, and the rotary sheath B3 has a spiral groove B31 configured to accommodate the tab B21. Thus, the rotary sheath B3 moves upwardly and downwardly in a limited path. Nevertheless, this conventional safety hook is machined with difficulty and causes high manufacturing costs.

Figure 13:
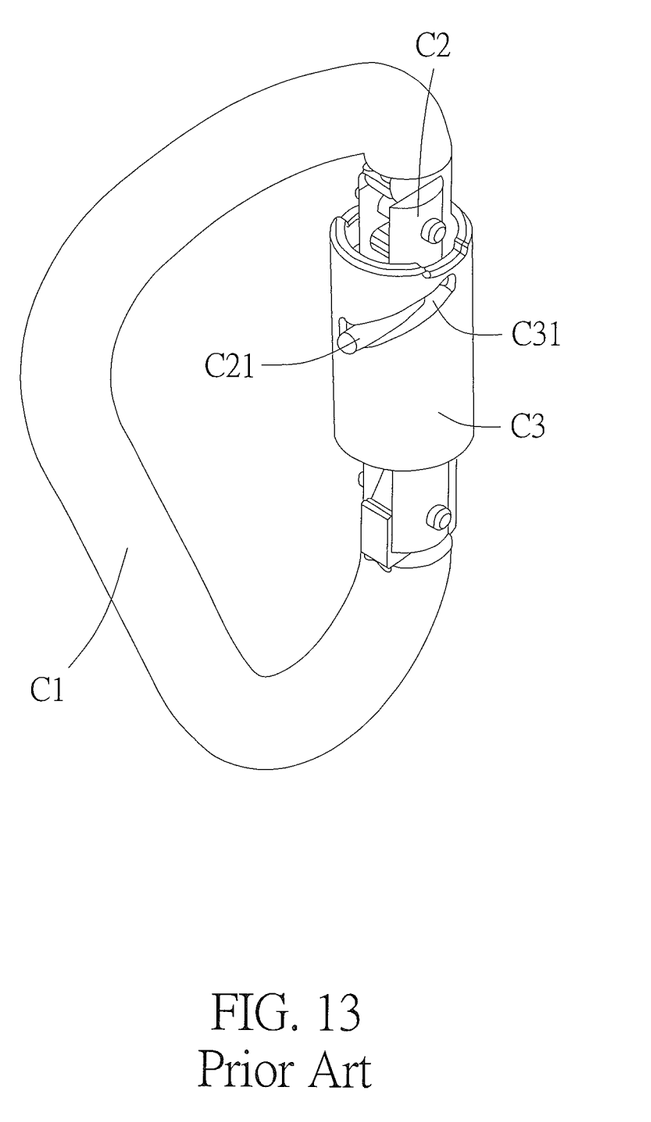
FIG. 13 is a perspective view of another conventional safety hook.

As shown in FIG. 13, a rotary safety hook includes a body C1 and a connection shaft C2 fixed on one end of an opening. The connection shaft C2 moves to close the opening and includes a tab C21 fitting with a rotary sheath C3, and the rotary sheath C3 has a spiral groove C31 defined thereon to house the tab C21. Thus, the rotary sheath C3 moves upwardly and downwardly in a limited path. However, the spiral groove C31 influences operating comfort, and dust gathers in the spiral groove C31 easily to have an unsafe operation.

The present invention has arisen to mitigate and/or obviate the afore-described disadvantages.

SUMMARY OF THE INVENTION

The primary objective of the present invention is to provide a dust-proof safety hook in which the body, the connection shaft, and the rotary sheath are reinforced greatly to endure force, and the housing sleeve is manufactured in the plastic injection molding manner, with the powder metallurgy manner or the metal injection molding manner being easy to reduce production cost.

A further objective of the present invention is to provide a dust-proof safety hook in which the rotary sheath has no gap to prevent dust gathering therein and to avoid the dust-proof safety hook being stuck by dust.

Another objective of the present invention is to provide a dust-proof safety hook in which the rotary sheath covers the second segment completely to enhance safety of the dust-proof safety hook and to operate the dust-proof safety hook easily, when the rotary sheath is pushed back to the second segment.

To obtain the above-mentioned objectives, a dust-proof safety hook provided by the present invention contains: a body, a connection shaft, a returning element, a housing sleeve, a resilient element, a rotary sheath, and a positioning bolt.

The body includes an accommodation space defined therein, an opening is formed on one side of the accommodation space, and a first segment and a second segment are arranged on two sides of the opening respectively.

A length of the connection shaft corresponds to a width of the opening of the body, and the connection shaft includes a first part and a second part retaining with the second segment of the body. The first part has a trench rotatably connecting with the first segment of the body so that the connection shaft rotates between the accommodation space and the second segment along the first part.

The returning element is mounted between the body and the connection shaft, such that the second part of the connection shaft moves to the second segment of the body to close the opening.

The housing sleeve is fitted with the connection shaft and includes a slot extending downwardly, and the slot has a limiting portion and two notches. The limiting portion is close to the second part, and the two notches are adjacent to the first part.

The resilient element is fitted with the connection shaft.

The rotary sheath is fitted on and moves relative to the connection shaft and the housing sleeve to close or open the second part of the connection shaft and the second segment of the body. The rotary sheath includes a through orifice defined thereon and a cut defined proximate to the first segment of the body.

A first end of the resilient element abuts against the connection shaft, and a second end of the resilient element is biased against the rotary sheath, so that the rotary sheath moves to close the second part of the connection shaft and the second segment of the body, and the through orifice aligns with the limiting portion.

The positioning bolt is inserted into the through orifice of the rotary sheath and the limiting portion of the slot of the housing sleeve, such that the rotary sheath moves along the slot of the housing sleeve by way of the positioning bolt.

DETAILED DESCRIPTION OF THE
PREFERRED EMBODIMENTS

The present invention will be clearer from the following description when viewed together with the accompanying drawings, which show, for purpose of illustration only, the preferred embodiments in accordance with the present invention.

With reference to FIGS. 1 to 4, a dust-proof safety hook according to a preferred embodiment of the present invention comprises:

a body 10 formed in a C-shape, with the body 10 including an accommodation space 11 defined therein, an opening 12 formed on one side of the accommodation space 11, a first segment 13 and a second segment 14 which are arranged on two sides of the opening 12 respectively, and with the first segment 13 having a retaining recess 131 defined therein;

a connection shaft 20, with a length of which corresponds to a width of the opening 12 of the body 10, with the connection shaft 20 including a first part 21 and a second part 22 retaining with the second segment 14 of the body 10, and with the first part 21 having a trench 211 rotatably connecting with the first segment 13 of the body 10 so that the connection shaft 20 pivotally rotates between the accommodation space 11 and the second segment 14 along the first part 21;

a fixing retainer 23 locked in the connection shaft 20 adjacent to the first part 21 of the connection shaft 20;

a returning element 30 mounted between the retaining recess 131 of the body 10 and the connection shaft 20, such that the second part 22 of the connection shaft 20 moves to the second segment 14 of the body 10 to close the opening 12;

a housing sleeve 40 formed in a plastic injection molding manner, a powder metallurgy manner or a metal injection molding manner, with the housing sleeve 40 fitted with the connection shaft 20 and including a slot 41 which has a first tilted section 411 obliquely extending downward, a second tilted section 412 obliquely downward, and a limiting portion 413 defined between the first tilted section 411 and the second tilted section 412, with the limiting portion 413 close to the second part 22 and vertically extending outward, and with each of the first tilted section 411 and the second tilted section 412 having a notch 414 formed on a distal end thereof;

a resilient element 50 fitted with the connection shaft 20, with a first end of the resilient element 50 abutting against the fixing retainer 23 of the connection shaft 20; and a rotary sheath 60 fitted on and moving relative to the connection shaft 20 and the housing sleeve 40 to close or open the second part 22 of the connection shaft 22 and the second segment 14 of the body 10, and with the rotary sheath 60 including a through orifice 61 defined thereon and a cut 62 defined on a bottom thereof proximate to the first segment 13 of the body 10 and mating with the first tilted section 411 and the second tilted section 412 of the slot 41.

When the resilient element 50 fits with the connection shaft 20, a second end of the resilient element 50 is biased against the rotary sheath 60, so that the rotary sheath 60 moves to close the second part 22 of the connection shaft 20 and the second segment 14 of the body 10, and so that the through orifice 61 aligns with the limiting portion 413.

The dust-proof safety hook further comprises a positioning bolt 70 inserted into the through orifice 61 of the rotary sheath 60 and the limiting portion 413 of the slot 41 of the housing sleeve 40, such that the rotary sheath 60 moves between the first tilted section 411 and the second tilted section 412 by way of the positioning bolt 70 and is stopped by the notch 414.

After assembling the dust-proof hook, the limiting portion 413 of the slot 41 of the housing sleeve 40 is close to and extends to the second part 22, and the first tilted section 411 or the second tilted section 412 obliquely extends from the limiting portion 413 to the first part 21.

Figure 1:
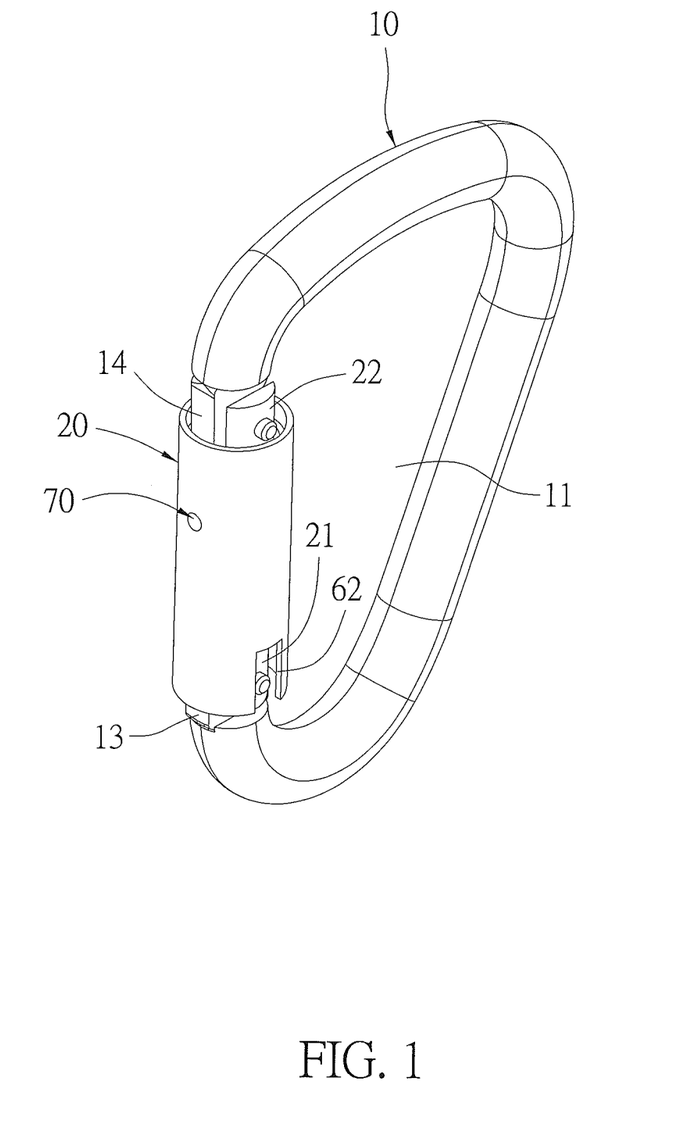
FIG. 1 is a perspective view showing the assembly of a dust-proof safety hook according to a preferred embodiment of the present invention.
Figure 2:
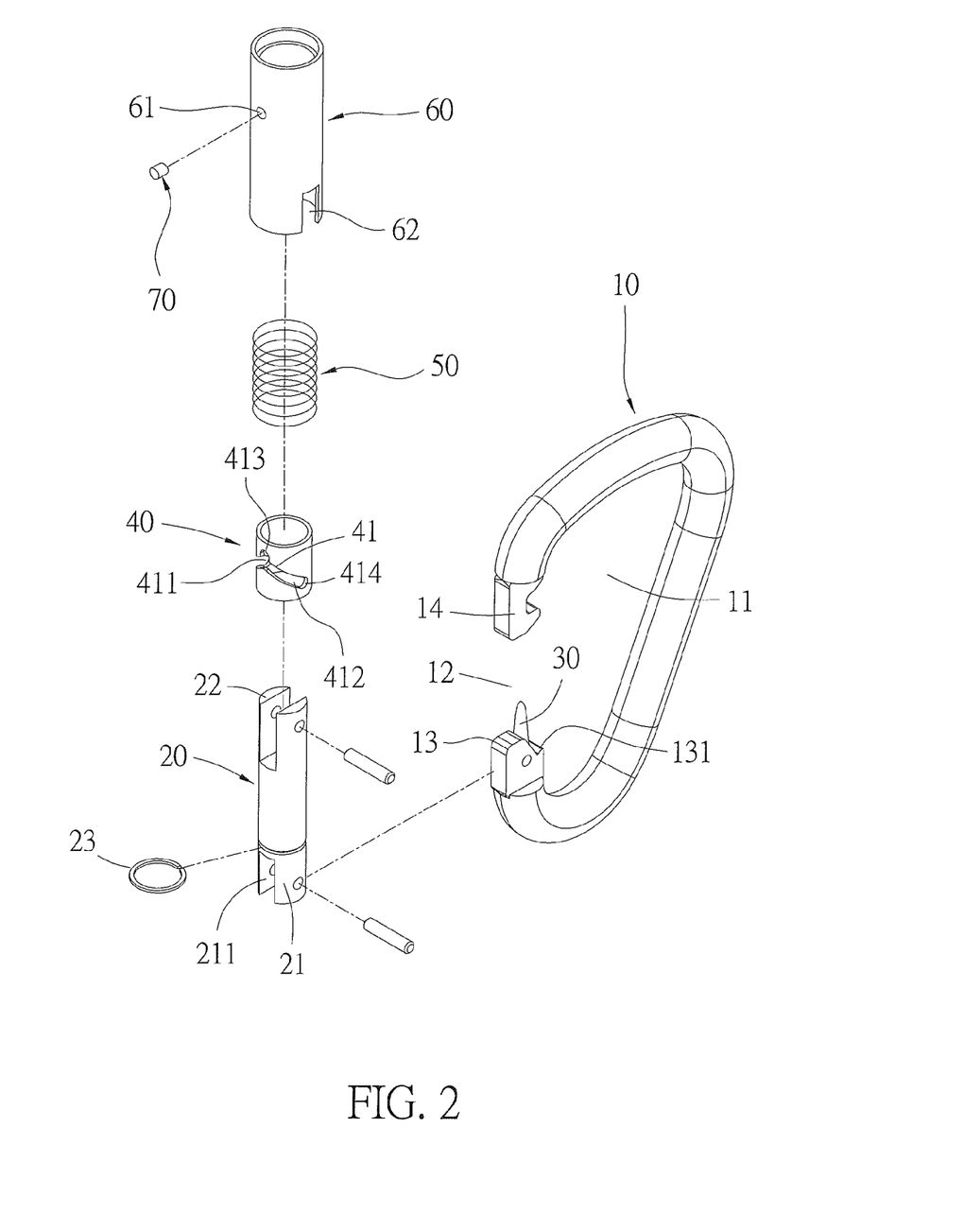
FIG. 2 is a perspective view showing the exploded components of the dust-proof safety hook according to the preferred embodiment of the present invention.
Figure 3:
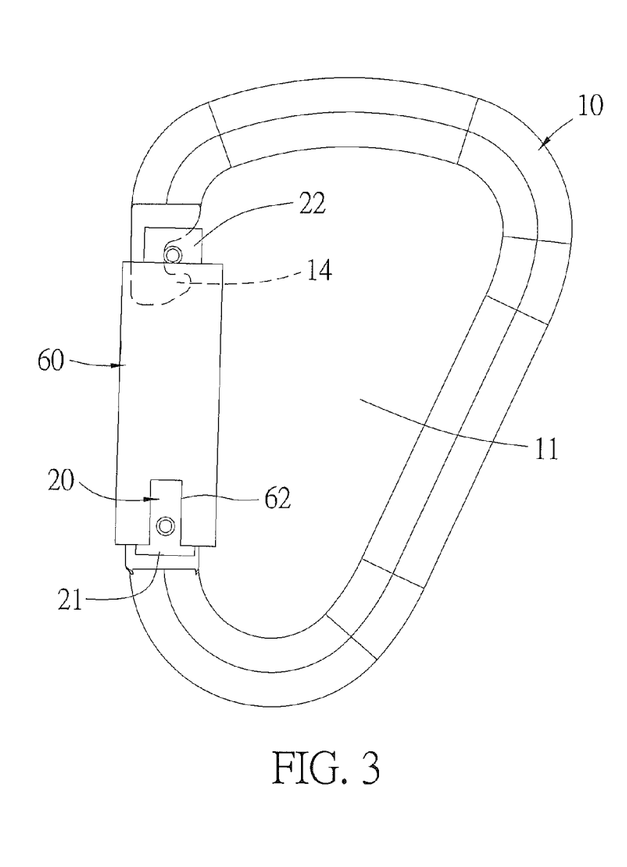
FIG. 3 is a side plane view showing the operation of the dust-proof safety hook according to the preferred embodiment of the present invention.
Figure 4:
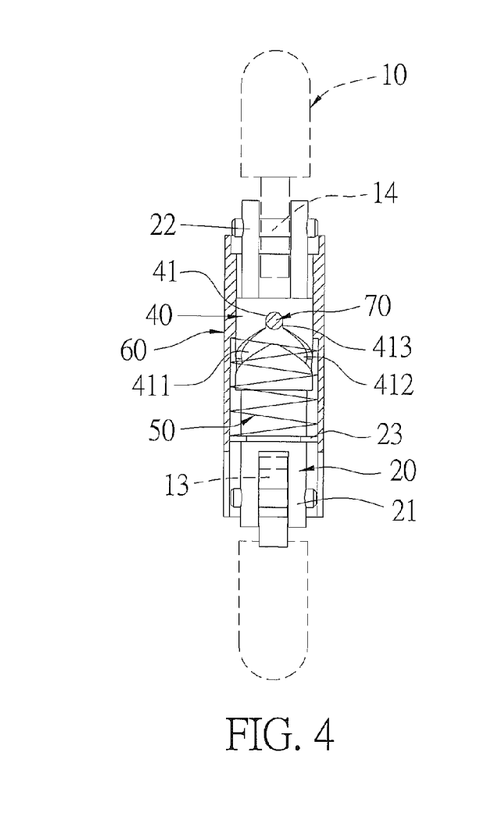
FIG. 4 is a cross sectional view showing the operation of the dust-proof safety hook according to the preferred embodiment of the present invention.

As the dust-proof safety hook is not forced, as shown in FIGS. 3 and 4, the second part 22 of the connection shaft 20 is pushed by the returning element 30 to close the second segment 14 of the body 10. Hence, the opening 12 and the accommodation space 11 are closed, and the rotary sheath 60 closes the second part 22 of the connection shaft 20 and the second segment 14 of the body 10, thus forming first and second protections to the opening 12.

Figure 5:
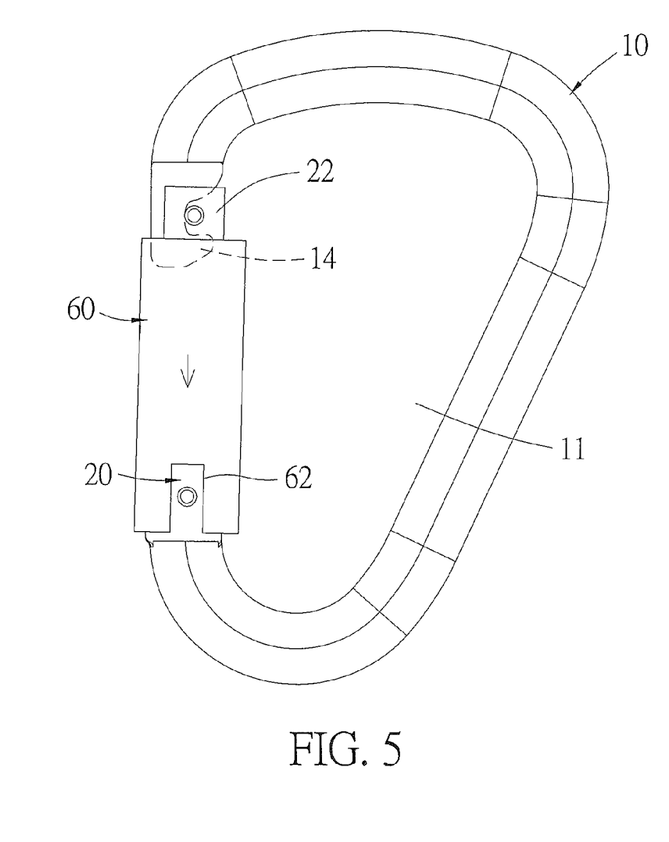
FIG. 5 is another side plane view showing the operation of the dust-proof safety hook according to the preferred embodiment of the present invention.
Figure 6:
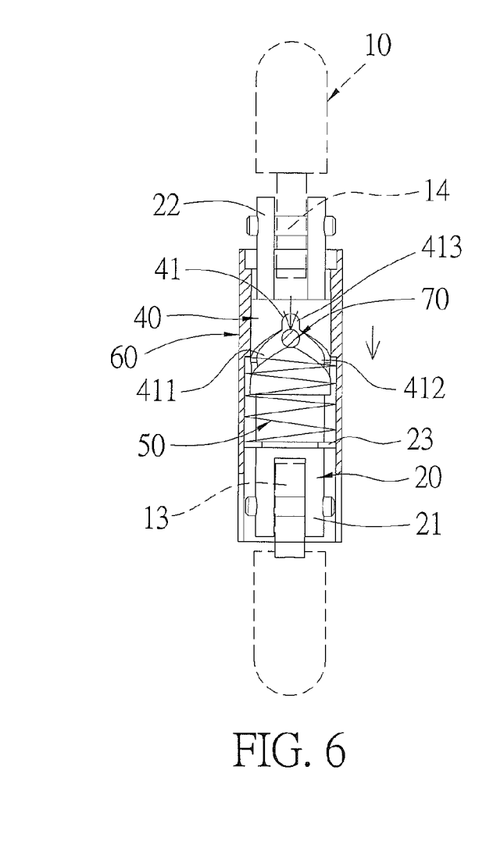
FIG. 6 is another cross sectional view showing the operation of the dust-proof safety hook according to the preferred embodiment of the present invention.
Figure 7:
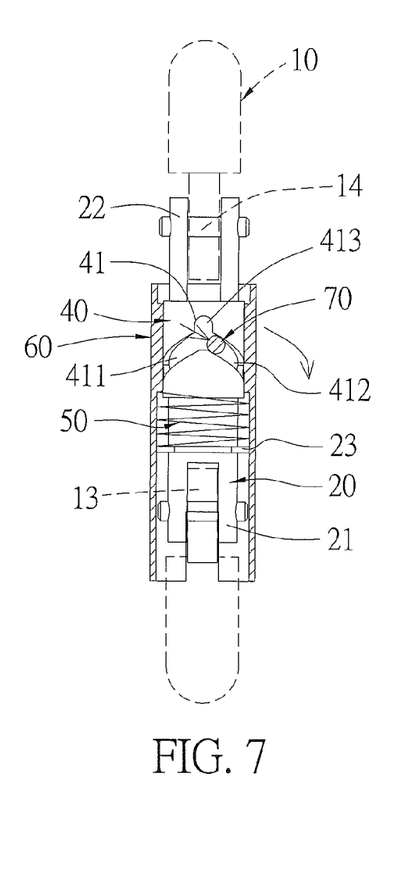
FIG. 7 is still another cross sectional view showing the operation of the dust-proof safety hook according to the preferred embodiment of the present invention.
Figure 8:
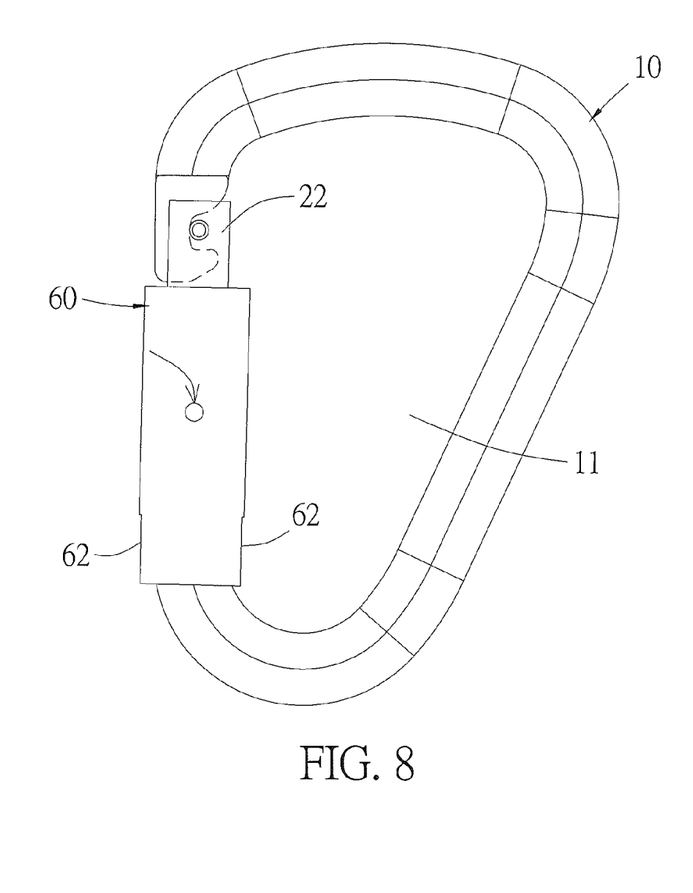
FIG. 8 is still another side plane view showing the operation of the dust-proof safety hook according to the preferred embodiment of the present invention.
Figure 9:
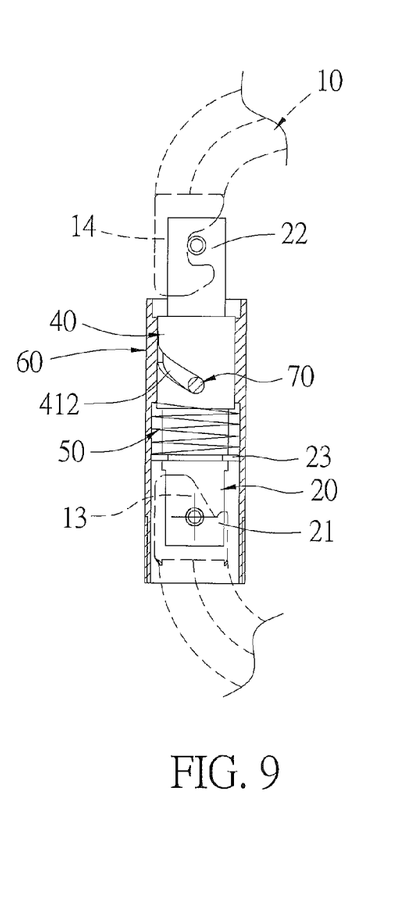
FIG. 9 is another cross sectional view showing the operation of the dust-proof safety hook according to the preferred embodiment of the present invention.
Figure 10:
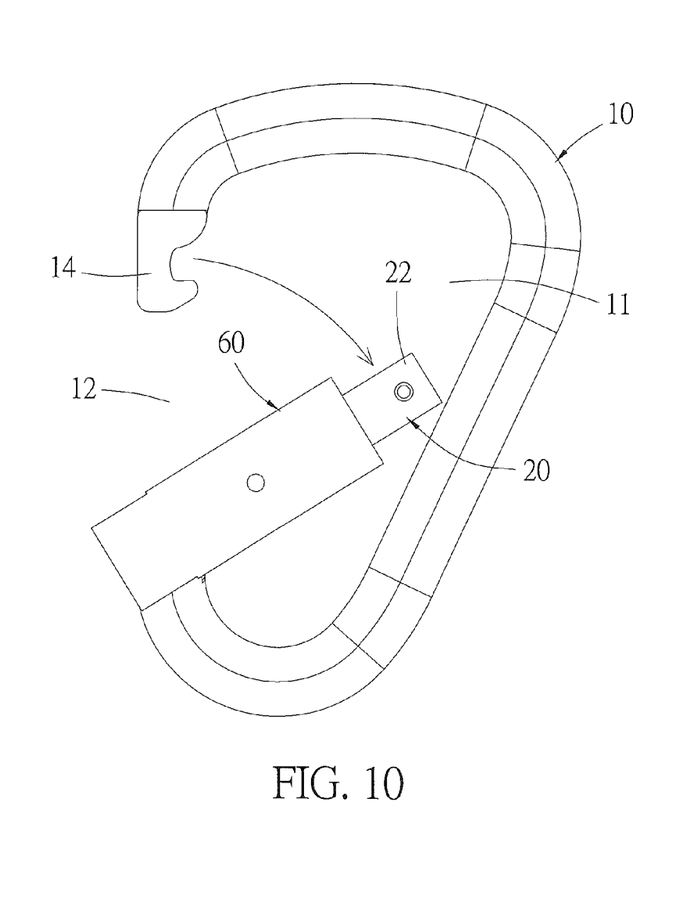
FIG. 10 is another side plane view showing the operation of the dust-proof safety hook according to the preferred embodiment of the present invention.

When desiring to open the opening 12 and insert or remove a rope into or from the accommodation space 11, as illustrated in FIGS. 5 and 6, the rotary sheath 60 is pushed to the first part 21 from the second part 22 to drive the positioning bolt 70 to remove from the limiting portion 413, and the rotary sheath 60 is rotated to press the resilient element 50, as shown in FIGS. 7 and 8. Hence, the positioning bolt 70 moves into the first tilted section 411 or the second tilted section 412, and the rotary sheath 60 moves to the first part 21 from the second part 22. Referring to FIGS. 9 and 10, when the rotary sheath 60 removes from the second segment 14 of the body 10 and when the cut 62 corresponds to the first segment 13, the connection shaft 20 and the rotary sheath 60 are pushed to rotate toward the accommodation space 11 along the first segment 13 and the first part 21, thus opening the opening 12. In the meantime, the first segment 13 moves into the cut 62. When releasing the connection shaft 20 and the rotary sheath 60, the returning element 30 urges the connection shaft 20 back to the opening 12, the resilient element 50 pushes the rotary sheath 60 to close the second segment 14, and the positioning bolt 70 moves back to the limiting portion 413.

Thereby, the dust-proof safety hook of the present invention contains advantages as follows:

1. The body 10, the connection shaft 20, and the rotary sheath 60 are reinforced greatly to endure force, and the connection shaft 20 fits with the housing sleeve 40. Preferably, the housing sleeve 40 is manufactured in the plastic injection molding manner, the powder metallurgy manner or the metal injection molding manner easily to reduce production cost.

2. The rotary sheath 60 has no gap to prevent dust gathering therein and to avoid the dust-proof safety hook being stuck by dust.

3. When the rotary sheath 60 is pushed back to the second segment 14, it covers the second segment 14 completely, thus enhancing safety of the dust-proof safety hook and operating the dust-proof safety hook easily.

While various embodiments in accordance with the present invention have been shown and described, it is clear to those skilled in the art that further embodiments may be made without departing from the scope of the present invention.

What is claimed is:

1. A dust-proof safety hook comprising:
a body including an accommodation space defined therein, with an opening formed on one side of the accommodation space, and with a first segment and a second segment arranged on two sides of the opening respectively;
a connection shaft having a length corresponding to a width of the opening of the body, with the connection shaft including a first part and a second part retaining with the second segment of the body, wherein the first part has a trench rotatably connecting with the first segment of the body so that the connection shaft pivotally rotates between the accommodation space and the second segment along the first part;
a returning element mounted between the body and the connection shaft, such that the second part of the connection shaft moves to the second segment of the body to close the opening;
a housing sleeve fitted with the connection shaft and including a slot extending downwardly, with the slot having a limiting portion and two notches, wherein the limiting portion is close to the second part, and wherein the two notches are adjacent to the first part;
a resilient element fitted with the connection shaft;
a rotary sheath fitted on and moving relative to the connection shaft and the housing sleeve to close or open the second part of the connection shaft and the second segment of the body, with the rotary sheath including a through orifice defined thereon and a cut defined proximate to the first segment of the body, with a first end of the resilient element abutting against the connection shaft and a second end of the resilient element being biased against the rotary sheath so that the rotary sheath moves to close the second part of the connection shaft and the second segment of the body, and so that the through orifice aligns with the limiting portion; and
a positioning bolt inserted into the through orifice of the rotary sheath and the limiting portion of the slot of the housing sleeve, such that the rotary sheath moves along the slot of the housing sleeve by way of the positioning bolt.

2. The dust-proof safety hook as claimed in claim 1, wherein the first segment of the body has a retaining recess defined therein, and wherein the returning element is mounted between the retaining recess of the body and the connection shaft.

3. The dust-proof safety hook as claimed in claim 1 further comprising a fixing retainer locked in the connection shaft adjacent to the first part of the connection shaft, wherein the resilient element is fitted with the connection shaft, and wherein the first end of the resilient element abuts against the fixing retainer.

4. The dust-proof safety hook as claimed in claim 1, wherein the slot has a first tilted section obliquely extending downward, and wherein the rotary sheath moves to the first tilted section by way of the positioning bolt.

5. The dust-proof safety hook as claimed in claim 1, wherein the slot has a second tilted section obliquely extending downward, and wherein the rotary sheath moves to the second tilted section by way of the positioning bolt.

6. The dust-proof safety hook as claimed in claim 1, wherein the slot has a first tilted section obliquely extending downward and has a second tilted section obliquely extending downward, and wherein the rotary sheath moves between the first tilted section and the second tilted section by way of the positioning bolt.

7. The dust-proof safety hook as claimed in claim 1, wherein the limiting portion vertically extends outward and has an extending length different to that of the slot.

* * * * *